(12) United States Patent
Nafziger

(10) Patent No.: US 11,964,901 B2
(45) Date of Patent: Apr. 23, 2024

(54) METHOD AND APPARATUS FOR FORMING A PARISON

(71) Applicant: Owens-Brockway Glass Container Inc., Perrysburg, OH (US)

(72) Inventor: Gregory W. Nafziger, Archbold, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

(21) Appl. No.: 17/743,815

(22) Filed: May 13, 2022

(65) Prior Publication Data

US 2022/0267186 A1 Aug. 25, 2022

Related U.S. Application Data

(62) Division of application No. 16/555,622, filed on Aug. 29, 2019, now Pat. No. 11,365,144.

(51) Int. Cl.
| | |
|---|---|
| *C03B 7/086* | (2006.01) |
| *B65D 1/02* | (2006.01) |
| *C03B 7/088* | (2006.01) |
| *C03B 9/193* | (2006.01) |

(52) U.S. Cl.
CPC .............. *C03B 9/1932* (2013.01); *B65D 1/02* (2013.01); *C03B 7/086* (2013.01); *C03B 7/088* (2013.01)

(58) Field of Classification Search
CPC ..... C03B 7/086; C03B 7/088; B29C 48/0015; B29C 48/0017; B29C 49/0042; B29C 9/342; B29C 9/325; B29C 9/3654; B29C 9/3833; B29C 7/14
See application file for complete search history.

(56) References Cited

U.S. PATENT DOCUMENTS

| | | | | |
|---|---|---|---|---|
| 1,592,299 A | * | 7/1926 | Howard | ................... C03B 7/086 65/181 |
| 1,631,061 A | * | 5/1927 | Rankin | ................... C03B 7/092 65/331 |
| 4,162,152 A | * | 7/1979 | Petro | ....................... C03B 7/088 65/327 |

* cited by examiner

*Primary Examiner* — Erin Snelting

(57) ABSTRACT

A method and apparatus for forming a glass parison are disclosed. A glass parison forming apparatus includes a feeder spout having an orifice ring, a plunger carried in the feeder spout and including a blow conduit therethrough, and a neck ring located immediately downstream of the orifice ring, with no chutes, scoops, or other gob handling devices therebetween. A glass container produced by the disclosed method and apparatus is also described.

14 Claims, 3 Drawing Sheets

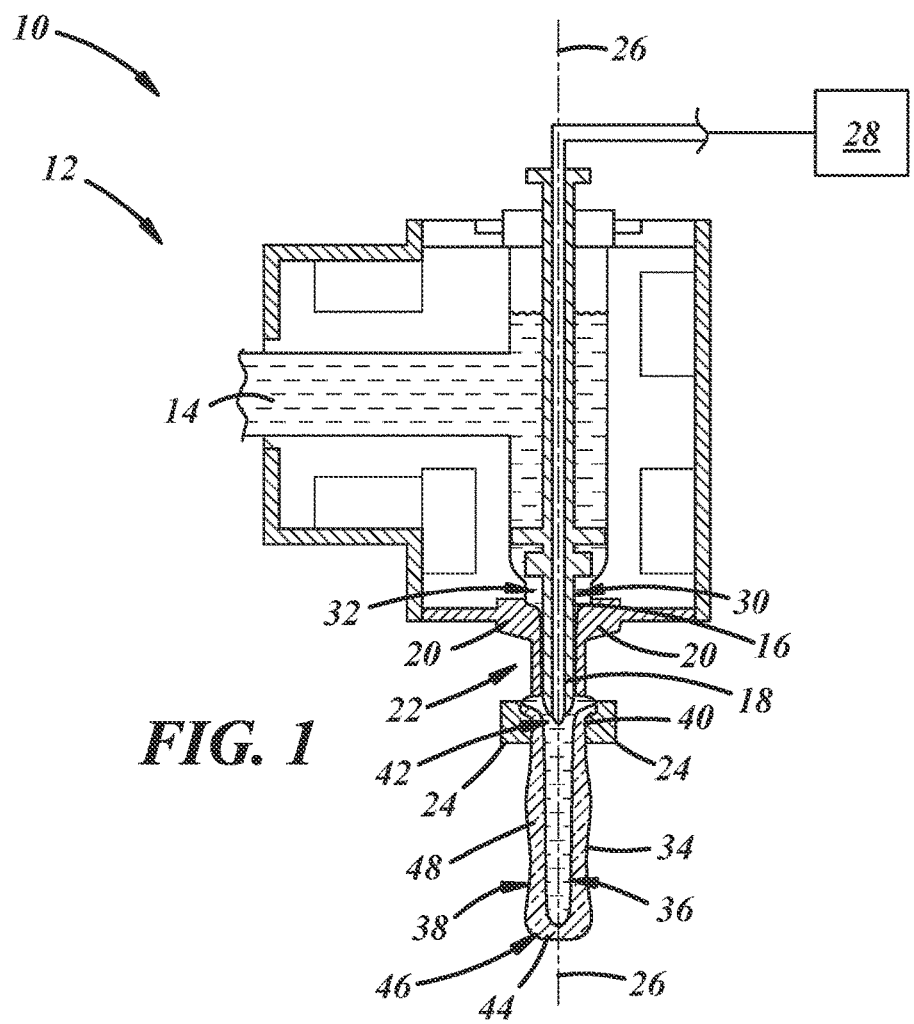
FIG. 1
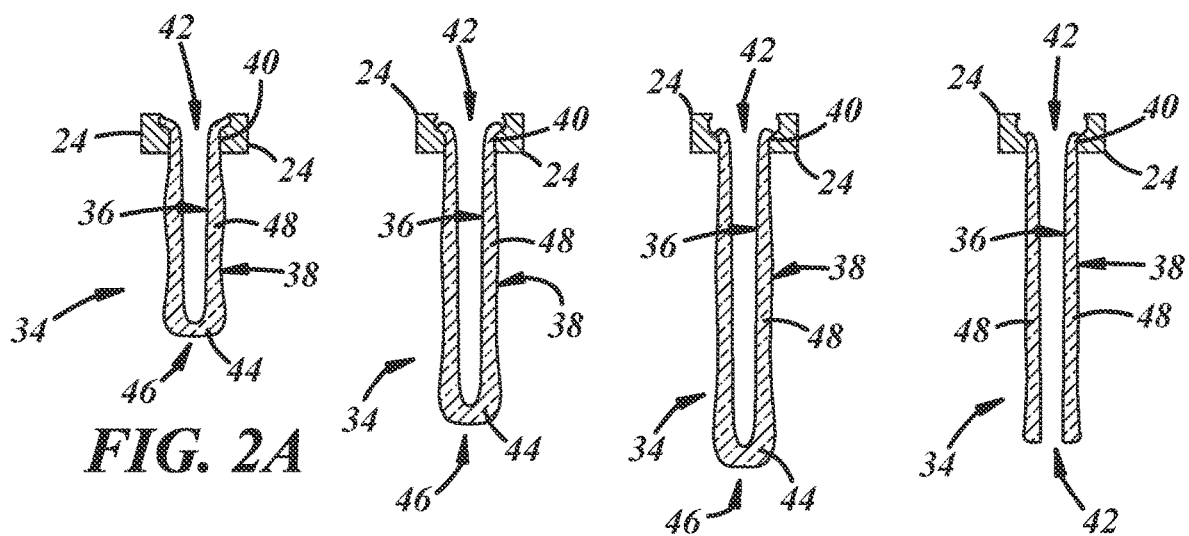
FIG. 2A  FIG. 2B  FIG. 2C  FIG. 2D

| 10 | Glass parison forming apparatus |
|---|---|
| 12 | Glass feeder |
| 24 | Neck ring |
| 28 | Compressed air source |
| 50 | Parison transfer equipment |
| 52 | Blow mold equipment |

METHOD AND APPARATUS FOR FORMING A PARISON

This patent application discloses systems and methods for glass container manufacturing, and more particularly, systems and methods for forming glass containers by blow molding glass parisons.

BACKGROUND

A parison can include a partially-shaped mass of molten glass formed after a glass furnace and prior to formation of a finished container. Glass container manufacturing processes can include melting glass in a furnace, feeding the molten glass into a blank mold to form a parison, opening the blank mold and inverting the parison while transferring the parison to an open blow mold, closing the blow mold, and blowing the parison against internal walls of the blow mold to form a finished container.

BRIEF SUMMARY OF THE DISCLOSURE

The present disclosure embodies a number of aspects that can be implemented separately from or in combination with each other.

A method of forming a glass parison in accordance with one aspect of the disclosure includes flowing molten glass to a glass feeder spout located immediately upstream of a neck ring; feeding molten glass through an annular space established between an orifice ring of the glass feeder spout and a plunger of the glass feeder spout; blowing gas through the plunger into the molten glass to establish an exterior and an interior of the glass parison; and contacting a portion of the exterior of the parison with the neck ring.

A method of forming a glass parison in accordance with one aspect of the disclosure includes flowing molten glass to a glass feeder spout located immediately upstream of a neck ring; feeding molten glass through an annular space established between an orifice ring of the glass feeder spout and a plunger of the glass feeder spout; blowing gas through the plunger into the molten glass to establish an exterior and an interior of the glass parison; contacting a portion of the exterior of the glass parison with the neck ring; transferring the neck ring and the glass parison to a location further downstream of the glass feeder spout; blowing the glass parison into a container; and attaching a bottom side to the container.

A glass parison forming apparatus in accordance with one aspect of the disclosure includes a feeder spout including an orifice ring; a plunger carried in the feeder spout and including a blow conduit therethrough; and a neck ring located immediately downstream of the orifice ring, with no chutes, scoops, or other gob handling devices therebetween.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is a fragmentary cross-sectional view of a glass feeder and neck ring for forming a glass parison in accordance with an illustrative embodiment of the present disclosure;

FIGS. 2A-2D are elevational views of a parison according to an illustrative embodiment of the present disclosure that may be produced by the glass feeder and neck ring illustrated in FIG. 1;

DETAILED DESCRIPTION

Figures 3, 4:
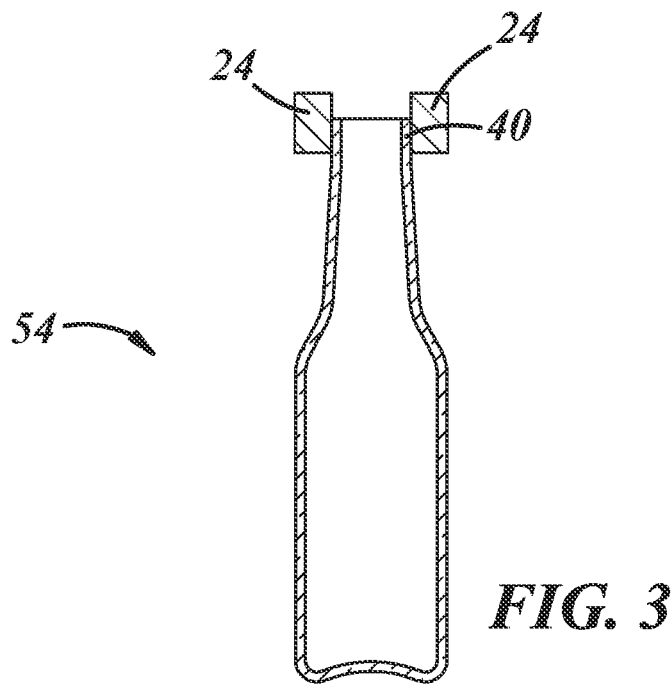
FIG. 3 is an elevational view showing a glass container according to an illustrative embodiment of the present disclosure that may be produced by the glass feeder and neck ring illustrated in FIG. 1 and from the parisons illustrated in FIGS. 2A-2D.
FIG. 4 is a schematic view of a glass parison forming apparatus according to an illustrative embodiment of the present disclosure including the glass feeder and neck ring of FIG. 1.

A general object of the present disclosure, in accordance with at least one aspect of the disclosure, is to provide an apparatus and method for forming a glass parison using a neck ring and a glass feeder having a plunger and blow conduit therethrough. The apparatus and method may eliminate some glass-to-metal contact during the parison-forming process, which provides increased container strength and improved glass thickness distribution. Other processes that utilize glass to metal contact may result in up to 66% waste glass. Moreover, the apparatus and method may be entirely under process control and are independent of physical blank molds, which can provide cost saving in conventional molding and gob delivery equipment. Further, the apparatus and method disclosed herein may provide the ability to dynamically change parison shape, which in turn can provide the advantage of rapid job changes and the opportunity to optimize or tune vertical glass thickness distribution in real time.

Silica-based glass (e.g., soda-lime-silica glass) as well as other types of glass are prevalent in the manufacture of glass containers and other articles. Molten glass used to make such articles can be conventionally prepared by reacting and melting a batch of glass-forming materials in a refractory lined, continuously operated glass furnace, tank, and/or pot. The batch of glass-forming materials is typically introduced into the furnace by being deposited into a pool of molten glass already in the furnace. The batch is gradually melted into the pool by continuous application of heat. After the batch has been melted, refined, and homogenized within the furnace, the resulting molten glass is typically directed to one or more forehearths where it is thermally conditioned by being cooled to a suitable temperature for forming. A feeder located at a downstream end of the one or more forehearths can be used to measure out and form predetermined amounts of molten glass, which can be delivered to an individual section machine. The molten glass is then formed into parisons and, subsequently, individual glass articles using a glass forming machine. Conventional equipment generally requires the use of a blank mold to form a parison. However, the use of a blank mold involves glass-to-metal contact.

Consequently, the present disclosure is directed to an apparatus and method that forms a parison using air blown from a plunger in a glass feeder, as well as a neck ring that is located immediately downstream from the glass feeder. By forming the parison using the blown air and the neck ring, the need for a conventional blank mold to form the parison is eliminated.

Referring generally to FIGS. 1 and 2, a glass parison forming apparatus 10 is shown in accordance with an illustrative embodiment of the present disclosure. The glass parison forming apparatus 10 can comprise a glass feeder 12 for providing molten glass 14, the glass feeder 12 further including a plunger 16 having a blow conduit 18, an orifice ring 20, and a spout 22. The glass feeder 12 feeds molten glass 14 into a neck ring 24 located directly downstream from the glass feeder 12.

As illustrated in FIG. 1, the glass parison forming apparatus 10 can include a glass feeder 12 that provides molten glass 14 and controls the temperature and quantity of the molten glass 14 as it flows from the working end of a furnace and forehearth to the spout 22 and out of the glass feeder 12. Numerous gas burners (not shown) in the glass feeder 12 can be regulated to form a desired temperature profile in the molten glass 14 as it flows through a feeder channel of the glass feeder 12. It will be appreciated that other equipment/methods may also be used for forming the desired temperature profile in the molten glass 14, for example active insulation.

The glass feeder 12 includes a plunger 16 to push molten glass 14 out of the glass feeder 12. The plunger 16 can reciprocate and be aligned along a longitudinal axis 26 and above the orifice ring 20. The plunger 16 may include a hydraulic, a pneumatic, an electric, or any other suitable type of actuator. In one specific example, the plunger 16 may include a screw-type plunger. As illustrated in FIG. 1, the plunger 16 can further include a blow conduit 18 disposed in the center of the plunger 16 and aligned along the longitudinal axis 26. The blow conduit 18 can be coupled to a compressed air source 28, for example an air compressor and/or a compressed air tank. Compressed air can be released from the compressed air source 28 to the blow conduit 18 and can exit the blow conduit 18 through an outlet 30 proximate to a spout 22 of the glass feeder 12.

The glass feeder 12 may include the spout 22 at a downstream end of the glass feeder 12. The spout 22 can dispense molten glass 14 from the glass feeder 12. Additionally, the spout 22 can include the orifice ring 20 to at least partially control flow of and/or provide heat to the molten glass 14. For example, the orifice ring 20 can include a heating mechanism to control temperature and/or viscosity of the molten glass 14 as it exits from the spout 22. The heating mechanism may include a flame burner, an electrical resistance heater, a microwave heater, or any other suitable heater. An annular space 32 can be defined by and disposed between the plunger 16 and the orifice ring 20. The molten glass 14 flows between the plunger 16 and the orifice ring 20 through the annular space 32 and from the spout 22 to create a hollow or tube-like stream of molten glass 14. Those of ordinary skill in the art will recognize that the glass feeder 12 may include shears (not shown) below the orifice ring 20 to cut and/or separate the molten glass 14. The shears may include hydraulic, pneumatic, electric, or any other suitable type of actuators.

As the plunger 16 pushes molten glass 14 from the glass feeder 12 and through the orifice ring 20 and spout 22, air from the compressed air source 28 flows through the blow conduit 18 and into the molten glass 14 to form a parison 34 with an interior 36 and an exterior 38. In this way, the glass feeder 12 can be used to form the parison 34 as a free surface (e.g., without contact from or using a blank mold).

Disposed directly downstream from the spout 22 and orifice ring 20 is the neck ring 24 with no chutes, scoops, or other gob handling devices therebetween. The neck ring 24 can include two semi-circular neck ring sections of, for example, cast bronze or steel construction. The sections can abut each other for forming a container neck finish 40 and for transporting the parison 34 downstream. The molten glass 14 can be extruded from the glass feeder 12 through the orifice ring 20 and spout 22 to the neck ring 24, which is configured to carry the parison 34 and create the neck finish 40 during the parison forming step.

FIGS. 2A through 2C depict stages of the parison-forming process, where the glass feeder 12 extrudes the molten glass 14 to the neck ring 24, and the blow conduit 18 blows air into the molten glass 14 being extruded to form a free surface parison 34. By controlling the rate of extrusion using the plunger 16, the rate of air flow from the blow conduit 18, and heating of the orifice ring 20, a diameter and wall thickness of the parison 34 can be controlled. In an example, a stroke profile of the plunger 16 can be controlled while simultaneously controlling the orifice ring 20 temperature and the internal air pressure within the blow conduit 18 to form a parison 34 having desired characteristics. As shown in FIGS. 2A-2C, the parison 34 may include the neck finish 40 at an open end 42, an end wall 44 at a closed end 46, and a sidewall 48 extending between the open end 42 and the closed end 46. In other instances, and as illustrated in FIG. 2D, the parison 34 may be formed without a closed end 46, and the closed end 46 may be added or attached in a downstream process step, for example by welding glass to an open end 42. Alternatively, the open end 42 may be closed by exposing the open end 42 to a flame or other heat source while rotating the parison 34 such that the flame or heat source heats the open end 42 while using rollers, where the sides of the open end 42 are bent inward toward the longitudinal axis 26 until the open end 42 is closed to produce a closed end 46. In some instances, the parison 34 may further be scored and separated and/or may be reheated and progressively stretched until sealed using a series of rolling operations.

Parison transfer equipment 50 may be used to transfer the parison 34 from the glass feeder 12 and parison-forming location to a blow side of the process that includes blow mold equipment 52. Those of ordinary skill in the art will recognize that the parison transfer equipment 50 may include an invert arm or other arm that may be rotated and/or moved by an actuator, for example, a motor of any kind, or any other suitable device that can rotate or move the arm. In any case, the parison transfer equipment 50 can be configured to invert and/or move the parison 34 into a portion of the blow mold equipment 52. In an embodiment, the invert arm or other arm may be coupled to the neck ring 24 in any suitable manner, and may include any suitable equipment that may be used to retract portions of the neck ring 24 to release the parison 34.

The blow mold equipment 52 can include a blow mold configured to form the parison 34 into a final shape of a glass container 54. The parison transfer equipment 50 can transfer the parison 34 to the blow mold so that the parison 34 is suspended within the blow mold. While suspended, the parison 34 can be allowed to re-heat and/or elongate within the blow mold. More specifically, the parison 34 may be suspended at its neck finish by the neck ring 24, or the neck ring 24 may be removed such that the parison 34 is suspended at its neck by corresponding portions of the blow mold, or in any other suitable manner. For instance, the parison 34 may be formed with a closed end 46 as part of the extrusion process by the plunger 16, the blow conduit 18, the orifice ring 20, the neck ring 24, and/or at least one shearing mechanism (not shown). In one instance, two shearing mechanisms may be used where a first shearing mechanism can be used to close the closed end 46 of the free form parison 34, and a second shearing mechanism can be used to sever the parison 34 from the flowing molten glass 14. It will be appreciated that the closed end 46 can be formed using a variety of equipment and methods. In another instance, the parison 34 may be formed without a closed end 46. In this case, the blow mold equipment 52 or other equipment, for example, a glass welder, may be configured to form a finish and/or closed end 46 of the final glass container 54.

Figure 5:
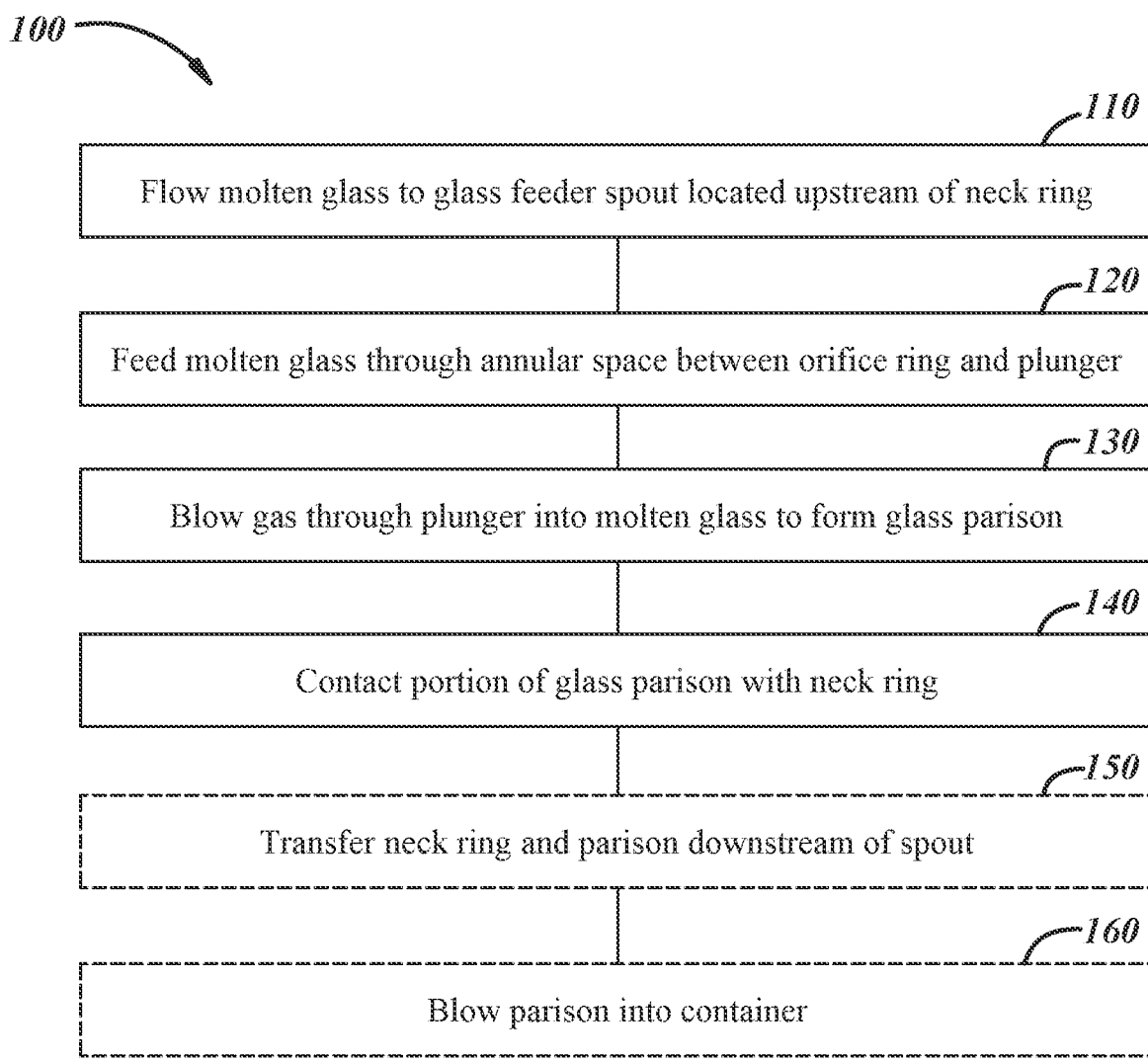
FIG. 5 is a flow diagram showing various steps of an illustrative embodiment of a method for forming a parison using the glass feeder and neck ring of FIG. 1.

FIG. 5 illustrates an example of a method 100 for free forming the glass parison using the glass feeder 12 and the neck ring 24. For purposes of illustration and clarity, method 100 will be described in the context of the glass parison forming apparatus 10 described above and generally illustrated in FIGS. 1 through 4. It will be appreciated, however, that the application of the present methodology is not meant to be limited solely to such an arrangement, but rather method 100 may find application with any number of arrangements (i.e., steps of method 100 may be performed by components of the glass parison forming apparatus 10 other than those described below, or arrangements of the glass parison forming apparatus 10 other than that described above).

In an embodiment, method 100 comprises a step 110 of flowing molten glass 14 to a glass feeder spout 22. In implementations, the spout 22 is located directly upstream from the neck ring 24, and flowing the molten glass 14 can include moving the plunger 16 along the longitudinal axis 26 to cause the molten glass 14 to flow directly from the spout 22 to the neck ring 24. When flowing the molten glass 14, the plunger 16 can be used to at least partially determine the shape and thickness of the parison 34 by adjusting a plunger stroke profile and the flow rate of the molten glass 14.

Next, method 100 comprises a step 120 of feeding the molten glass 14 through an annular space 32 disposed between the orifice ring 20 and the plunger 16. In this step, the plunger 16 can be used to push the molten glass 14 through the annular space 32. The annular space 32 can serve to form the molten glass 14 into a hollow and/or tube-shaped form as it is extruded from the spout 22 of the glass feeder 12. The hollow or tube-shaped form can be changed by adjusting the plunger 16 position so that the annular space 32 is larger or smaller. Additionally, the orifice ring 20 may heat the molten glass 14 as it is fed through the annular space 32 using a heating element.

Method 100 comprises a step 130 of blowing gas through the plunger 16 and blow conduit 18 to form the free surface glass parison 34. As the molten glass 14 is extruded and flows through the annular space 32 between the plunger 16 and the orifice ring 20, a gas (e.g., compressed air) can simultaneously flow through the blow conduit 18 and into the extruded molten glass 14 to free form a parison 34 with an exterior 38 and an interior 36. The blow gas can push the sidewall 48 and/or the closed end 46 of the molten glass 14 out to form the parison 34 into a desired shape, depending at least partially on the extrusion rate of the molten glass 14 and the gas flow rate from the blow conduit 18. In one instance, blowing the gas can free form a parison 34 with a hollow or tube-shaped form having a first open end 42 and a second open end 42 (as shown in FIG. 2D). In another instance, blowing the gas can form a parison 34 with an open end 42 and a sealed or closed end 46 (as shown in FIG. 2C).

Step 140 of method 100 comprises contacting a portion of the exterior 38 of the glass parison 34 without a blank mold and with the neck ring 24, which is disposed directly downstream from the spout 22. In one example, contacting a portion of the glass parison 34 with the neck ring 24 can include extruding the molten glass 14 from the spout 22 directly through the neck ring 24, which may be in position during the extrusion and/or parison blowing step(s). In this example, the molten glass 14 can flow from the spout 22 directly through the neck ring 24 while gas from the blow conduit 18 is simultaneously blown into the molten glass 14 to form a desired shape of the parison 34.

In another example of step 140, contacting a portion of the glass parison 34 with the neck ring 24 can include extruding the molten glass 14 from the spout 22 while blowing gas using the blow conduit 18 to form the parison 34. The neck ring 24 can then be used to contact and grip the parison 34, for example at the open end 42 to form the neck finish 40.

In some instances, method 100 may comprise a step 150 of transferring the neck ring 24 and the parison 34 downstream of the spout 22. Transferring the neck ring 24 and the parison 34 can include using parison transfer equipment 50 to move the parison 34 downstream, for example to blow mold equipment 52 and/or a glass welder. In an example, the parison transfer equipment 50, including a neck ring arm coupled to the neck ring 24, can grip and move the parison 34 from under the spout 22 to blow mold equipment 52 for blowing the parison 34 into a finished container 54. In some instances, transferring the neck ring 24 may include inverting the parison 34. In other instances, transferring the neck ring 24 may include maintaining the orientation of the parison 34 from the parison-forming step to the blow-molding step without inverting the parison 34.

In an implementation, transferring the neck ring 24 and the parison 34 may include at least partially cooling the parison 34. In one instance, cooling the parison 34 may include partially cooling the parison 34 to a temperature less than a molten glass temperature and greater than ambient air temperature. In this case, the parison 34 may be partially cooled or heated prior to a severing step, which severing step may be performed by shears or other like equipment. The parison 34 may be at least partially cooled using cooling air and/or ambient air. The parison 34 may be cooled by blowing cooling air or cooling gas onto the exterior 38 of the parison 34.

Additionally, method 100 may comprise a step 160 of blowing the parison 34 into a glass container 54. In an implementation, blowing the parison 34 into a glass container 54 may occur proximate in time to transferring the parison 34 for using retained heat in the parison 34. Proximate in time means less than 5 seconds, and, in some instances, less than 3 seconds. Blowing the parison 34 into a glass container 54 can include suspending the parison within the blow mold equipment 52. While suspended, the parison 34 can be allowed to reheat, if previously cooled, and elongate within the blow mold. More specifically, the parison 34 can be suspended at its neck finish 40 by the neck ring 24 or corresponding portions of the blow mold such that a closed end 46 is free and not supported. Gas pressure can then be applied to the parison 34 to mold the parison 34 against the blow mold sides and into a glass container 54.

There thus has been disclosed an apparatus and method for forming a glass parison that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A glass parison forming apparatus, comprising:
a feeder spout including an orifice ring;

a plunger carried in the feeder spout and including a blow conduit therethrough, said plunger configured to be passable through said orifice ring; and a neck ring located immediately downstream of the orifice ring, with no chutes, scoops, or other gob handling devices therebetween and wherein said neck ring is configured to support a freely suspended parison.

2. The apparatus of claim 1, wherein the glass parison has a first open end, a second open end, and a sidewall extending between the first and second open ends.

3. The apparatus of claim 1, wherein the orifice ring is heated.

4. The apparatus of claim 3, wherein the orifice ring is heated to control the temperature of molten glass as it exits the spout.

5. The apparatus of claim 1, wherein the plunger is a screw plunger.

6. The apparatus of claim 1, wherein the blow conduit is radially disposed in the center of the plunger and extends through the plunger and along a longitudinal axis.

7. The apparatus of claim 1, wherein the apparatus feeds molten glass through an annular space established between the plunger and the orifice ring of the glass feeder spout and blows gas through the blow conduit of the plunger into the molten glass to establish an exterior and an interior of the glass parison, and wherein the neck ring contacts a portion of the exterior of the glass parison.

8. The apparatus of claim 1, wherein the apparatus does not include a blank mold to produce the parison.

9. The apparatus of claim 1, further comprising:
a compressed air source coupled to the plunger and blow conduit.

10. A glass parison forming apparatus, comprising:
a feeder spout including an orifice ring;
a plunger carried in the feeder spout and including a blow conduit therethrough, said plunger configured to be passable through said orifice ring; and
a neck ring located immediately downstream of the orifice ring, with no chutes, scoops, or other gob handling devices therebetween, and
wherein the blow conduit and the plunger are unitary.

11. A glass parison forming apparatus, comprising:
a feeder spout including an orifice ring;
a plunger carried in the feeder spout and including a blow conduit therethrough, said plunger configured to be passable through said orifice ring; and
a neck ring located immediately downstream of the orifice ring, with no chutes, scoops, or other gob handling devices therebetween, and
wherein the plunger is configured to extend into the neck ring.

12. A glass parison forming apparatus, comprising:
a feeder spout including an orifice ring;
a plunger carried in the feeder spout and including a blow conduit therethrough, said plunger configured to be passable through said orifice ring; and
a neck ring located immediately downstream of the orifice ring, with no chutes, scoops, or other gob handling devices therebetween, and
wherein the plunger and the blow conduit are configured to extend into the neck ring.

13. A glass parison forming apparatus, comprising:
a feeder spout including an orifice ring;
a plunger carried in the feeder spout and including a blow conduit therethrough, and being configured to push molten glass through the orifice ring and blow the molten glass into a parison; and
a neck ring located immediately downstream of the orifice ring, with no chutes, scoops, or other gob handling devices therebetween, and configured to create a neck finish of the parison that carries the parison freely suspended therefrom.

14. A glass container manufacturing system, comprising:
glass parison forming apparatus of claim 13 and having no blank mold;
a blow mold; and
glass parison transfer equipment to transfer the neck ring with the parison suspended therefrom to the blow mold.

* * * * *